Figure 1:
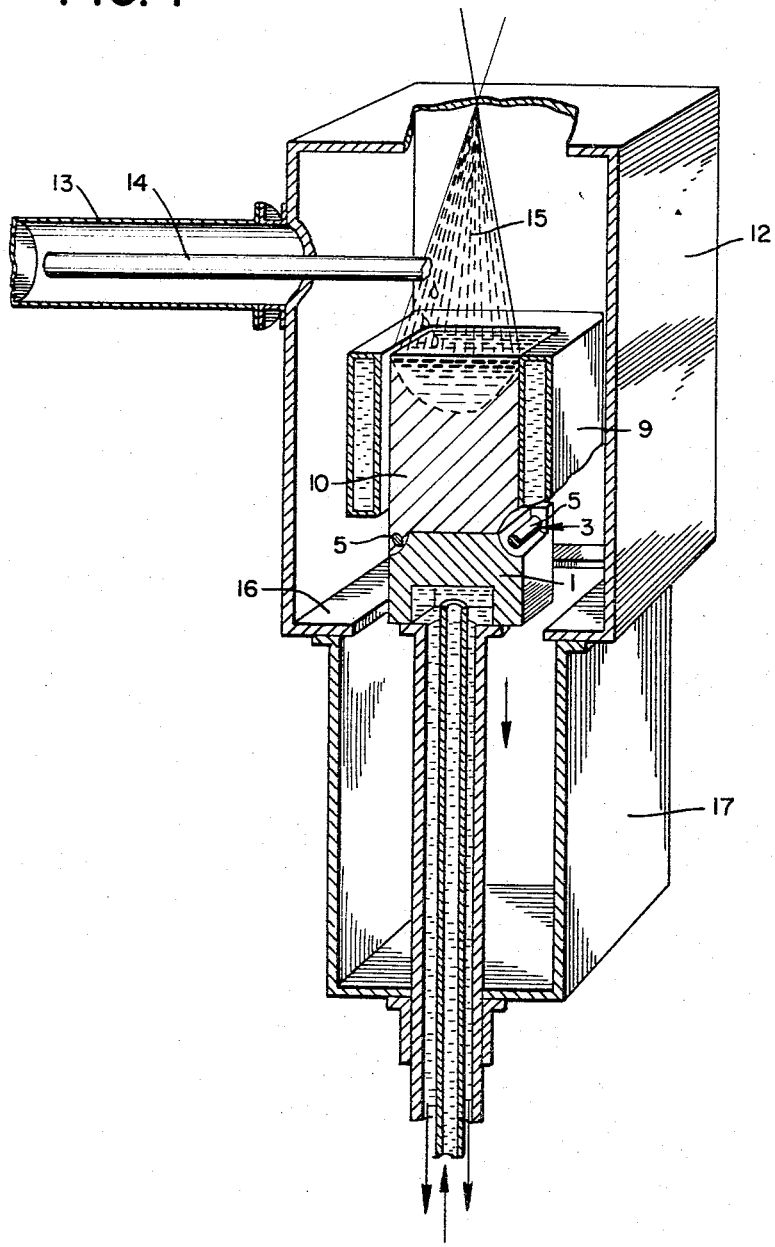

Aug. 1, 1967   H. FÖRSTER   3,333,627
APPARATUS FOR SUPPORTING A MELTING
Filed Dec. 10, 1964   4 Sheets-Sheet 1

INVENTOR.
HARRY FÖRSTER

Aug. 1, 1967  H. FÖRSTER  3,333,627
APPARATUS FOR SUPPORTING A MELTING
Filed Dec. 10, 1964  4 Sheets-Sheet 2

INVENTOR.
HARRY FÖRSTER

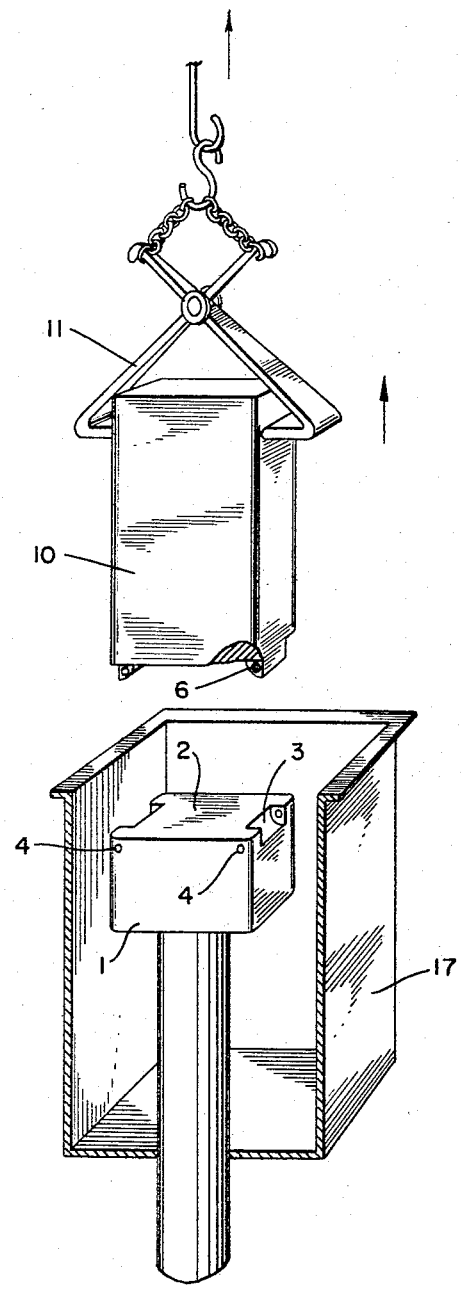

United States Patent Office 3,333,627
Patented Aug. 1, 1967

3,333,627
APPARATUS FOR SUPPORTING A MELTING
Harry Förster, Dresden, Germany, assignor to VEB Lokomotivbau-Elecktrotechnische Werke Hans Beimler, Henningsdorf, Germany
Filed Dec. 10, 1964, Ser. No. 417,397
8 Claims. (Cl. 164—282)

This invention relates to a method and apparatus for providing a melting coupling for joining a draw-piece contained within a melting forming apparatus to a melting formed thereon.

In the fabrication of a melting apparatus, the melting is drawn from a bottomless cooled mold at a rate dependent on the melt-down speed of the material to be melted within the device or apparatus. The drawing device which withdraws the melting from the forming apparatus contains a draw-piece at one end to serve as the bottom of the mold on which the melting builds up during the melting process. Continuous melting apparatuses are commonly employed for technological and economical reasons in melting and casting processes and employ both electron beam furnaces and vacuum arc furnaces.

In order to facilitate the withdrawal of the melting either continuously or intermittently from the mold, the drawing device is made detachable from the melt formed thereon after completion of the melting process. The draw-piece contained on the drawing device is often subject to heavy wear and considerable damage when the melt is detached after withdrawal of the forming apparatus. Moreover, materials of particularly high melting point often sinter or fuse with the surface of the drawing device. In the prior art this problem is largely overcome by the use of intermediate pieces between the melt and the drawing device. These intermediate pieces if possible should also be easily decoupled from the melt so as to allow them to be reused.

Two main types of melting couplings are known in the prior art. These are the direct and the indirect melting couplings. In direct couplings, the melted material has a force transmitting connection with the draw-piece predominantly by direct contact thereto. In indirect couplings, an intermediate piece of the same material as the melting is arranged above the draw-piece and is fused to the melting to facilitate either direct or indirect coupling. A known arrangement is often employed having a dovetail type recess into which the molten material flows, solidifies and thus forms a force transmitting connection. The detachment of this melting coupling is done by the horizontal sliding out of the melting. This, however, causes the draw-piece to be subject to very high wear and considerable damage. To overcome this disadvantage it has been known to insert a corresponding exactly machined intermediate piece of the same type to fuse with the melting. The production of these dovetail intermediate pieces, however, was found to be very costly and not always possible.

There is also known in the prior art the method of coupling by means of forming a thread. In this particular case the draw-piece is provided with a taphole into which the liquid material flows. The connection is thus separated by screwing the thread attachment out after the material solidifies. Heavy material wear of the draw-piece also occurs with this type of melting coupling during detachment and moreover it has been found that the thread surface within the draw-piece melts partially after repeated usage.

Most melting couplings known in the prior art have the disadvantage that the melting cannot be easily detached from the draw-piece due to the excessive weight of the melting, particularly those produced in high output melting plants. It must be possible to remove the melting by means of vertical lifting tools such as cranes, etc. Release of the dovetail and thread type connections with vertical lifting tools such as cranes, has always proved to be difficult. Moreover, the wear of the draw-pieces due to the described types of couplings has also been found to increase sharply with the increased weight of the melting. It is therefore desirable to provide a coupling that may be easily releasable so that the detachment of the draw-piece from the melting may be made at a safe distance from the melting, particularly in the case of relatively large meltings because of the considerable heat radiated therefrom.

It is accordingly an object of this invention to provide an improved coupling method and device for releasably detaching a melting from a draw-piece upon withdrawal from a melting apparatus.

It is another object of this invention to provide an improved coupling method and device for releasably detaching a melting from a draw-piece at a safe distance from the melting.

It is another object of this invention to provide an improved melting coupling method and apparatus capable of reducing the mechanical wear and damage caused by the melting against the draw-piece.

It is another object of this invention to provide an improved melting coupling method and apparatus for permitting the draw-piece to be reusable and interchangeable with subsequent meltings formed thereon.

In accordance with my invention I provide a draw-piece mounted on the end of a melting drawing device having one or more groove-shaped or rotationally symmetrical recesses into which the melt can flow and into which fitted material pieces of the same material as the melting can be inserted. The invention provides for one or more hollow sleeves or bushings to be inserted either longitudinally or transversely into the recesses. They are positioned releasably within the recesses by a connecting element such as a slidable bolt. The bolt is mounted on both sides of the recesses in the draw-piece and so designed that it can be driven through the draw-piece either from one direction or the other. Thus, when the melting process has been completed and the melting withdrawn from the mold the bolt is removed and the draw-piece is separated from the melting and the bushings or sleeves remain fused to the melting.

The technical and economic advantages of the invention are that the draw-piece attains a long life and is readily detachable from the melting in a simple manner. This is particularly advantageous for excessive weight since ordinary lifting tools can be used to handle the melting. Moreover, it is possible to employ automation techniques to separate the melting from the draw-piece since they now can be effectively decoupled at a distance.

Figure 2:
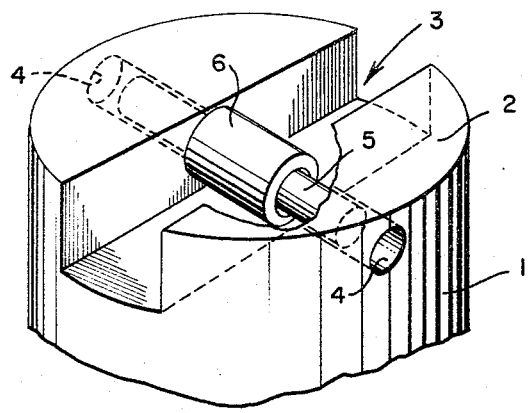
Figure 3:
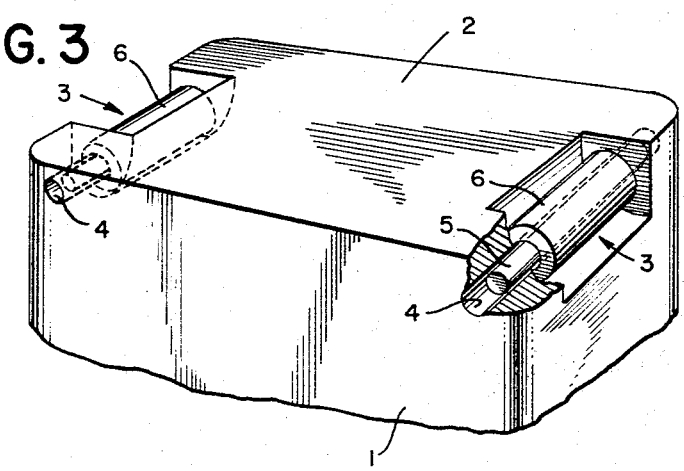
Figure 4:
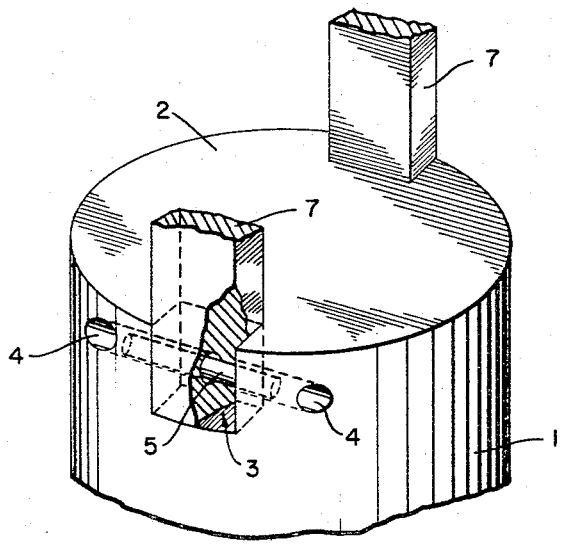
Figure 5:
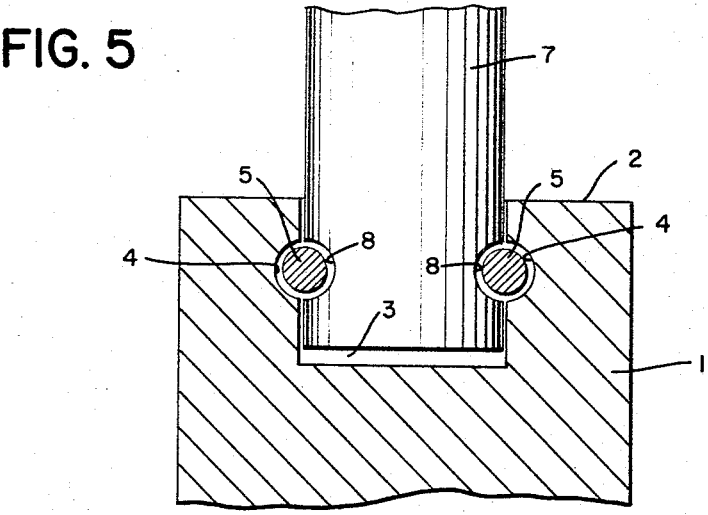
Figure 6:
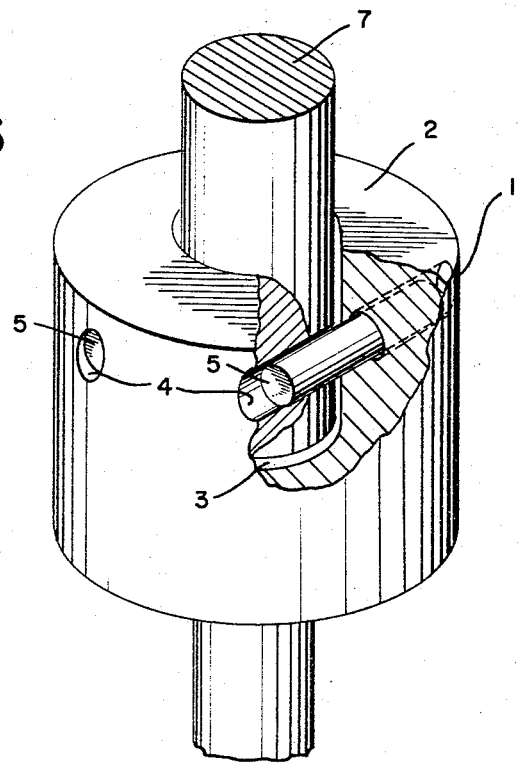

The novel features that I consider characteristic of my invention are set forth above. My invention itself, however, both as to its organization and its method of operation together with additional objects and advantages thereof will be understood from the following description when read in connection with the accompanying drawings, in which:

FIG. 1 is a diagrammatic cross-sectional view of an electron beam furnace melting system which employs the melting coupling apparatus method according to my invention, FIG. 2 shows a melting coupling according to my invention having a central recesss, FIG. 3 shows another embodiment of a melting coupling according to my invention having two lateral recesses, FIG. 4 shows a representation of a principle of a melting coupling according to the invention employing two laterally arranged material pieces of the same consistency as the melting, FIG. 5 shows another embodiment of a melting coupling according to my invention having a centrally arranged material piece of the same consistency as the melting, FIG. 6 shows another view of my invention according to FIG. 5, and FIG. 7 shows the melting vessel separated from the electron beam melting furnace and moved aside to permit the removal of the melting upward with a crane system.

FIG. 1 discloses an electron beam melting system consisting of a melting tank 12 containing a water-cooled mold 9. Through a lateral pipe 13, a melt-down bar 14 is inserted into the melting tank 12 so as to extend over the mold 9 and be in contact with the electron beam 15.

A water-cooled draw-piece 1 forms the bottom member of mold 9. The electron beam 15 melts bar 14 to form the melting 10 on the face of draw-piece 1. The draw-piece is then gradually lowered in the direction indicated by the arrow as the melting 10 is formed.

The bottom of the melting tank 16 has flanged to it a melting vessel 17. In the course of the melting period, the melting 10 is drawn down into the melting vessel 17. After the formation of the melting 10 is complete, the melting vessel 17 is separated from the melting tank 12 and moved aside.

FIG. 3 shows an enlarged view of the draw-piece 1 used in the electron beam furnace illustrated in FIG. 1 and in more detail illustrates one of the coupling improvements according to my invention. The rectangular draw-piece 1 contains a pair of lateral recesses 3 defined in each of its end faces. A bolt 5 is slidably inserted in each of the shaftways 4 so as to longitudinally extend across each of the recesses 3. Shaftway 4 extends entirely through draw-piece 1 so as to provide an exit hole on two of the side walls. A hollow bushing or sleeve 6 having a length approximately the same as the length of the recess 3 is inserted therein prior to the insertion of bolt 5 into shaftway 4. Bolt 5 is then inserted into draw-piece 1 so as to slidably contact bushing or sleeve 6 through its center. As the melting 10 is formed on surface 2 of draw-piece 1 at the start of the melting process the liquid material of the melting also flows into recesses 3. If the bushing 6 is smaller in volume than recess 3 the liquid melt will then partially or completely surround and fuse to the bushing 6 during the formation of the melting. It is advantageous to make the bushing 6 of the same material as the melting formed thereon so that the outer surface of bushing 6 will fuse more readily to the melting.

After the melting is removed from the furnace and melting vessel 17 is separated from the melting tank 12 as shown in FIG. 7, bolts 5 are removed from each of the grooves or recesses 3. The melting 10 is then gripped by the crane 11 and taken off the draw-piece 1 in the direction indicated by the arrow. The bushings or sleeve 6 remain fused to the melting 10 after its separation from draw-piece 1.

In FIG. 2, a symmetrically shaped draw-piece 1 having a melting forming surface 2 is shown containing a central recess 3. In shaftway 4 located beneath surface 2 a bolt 5 is slidably inserted. Bolt 5 demountably supports bushing 6 transversely within recess 3. Bushing or sleeve 6 completely encloses the portion of bolt 5 crossing recess 3.

Another embodiment of my invention is illustrated in FIG. 4 showing a cylindrical draw-piece 1 having two opposite recesses 3. Into these recesses are fitted material pieces 7 of the same material as the melting to be formed. Material pieces 7 extend above surface 2 and are fused or welded to the melting 10 formed thereon. After completion of the melting process, the bolts 5 are released in the manner as described before. The melting 10 is then removed from the draw-piece 1 by means of crane 11.

In FIGS. 5 and 6 another embodiment of the invention is illustrated which like that according to FIG. 4 is particularly suited for materials of very high melting temperatures such as tungsten, or for materials having the properties of bad mechanical machinability. A cylindrically shaped material piece 7 is fitted into a correspondingly shaped recess 3 in draw-piece 1. Shaftways 4 are located parallel to the diameter of draw-piece 1 and beneath its surface 2 so as to partially intersect recess 3 and material piece 7. Material piece 7 is of the same material as the melting to be formed therearound and is fitted with corresponding grooves 8 so as to partially engage bolts 5 inserted into shaftways 4. This method of coupling is particularly suited for hard materials such as tungsten since the groove 8 can be preworked when sintering the material piece 7. If desired, grooves 8 may also be ground into the surface of material piece 7. The material piece 7 will fuse or weld itself to the melting 10 as it is formed on the surface of draw-piece 1. After completion of the melting process and withdrawal of the melting and draw-piece from the electron beam furnace, the bolts 5 are released in the manner as described before and the melting 10 is separated from the draw-piece 1 and removed with crane 11.

Although certain specific embodiments of this invention have been disclosed and described it is to be understood that they are merely illustrative of this invention and modifications may, of course, be made without departing from the spirit and scope of the invention as defined in the appended claims.

What I claim is:

1. A draw-piece for supporting a melting in an electron beam melting apparatus and a vacuum melting apparatus, or the like, comprising a block having surfaces defining at least one recess, means releasably disposed within said recess for engaging a portion of and forming a part of the said melting, said releasably disposed means comprising a hollow sleeve disposed within and transversely across said recess, and means for releasably holding said sleeve within said recess.

2. A draw-piece as recited in claim 1 wherein said sleeve is constructed of the same material as said extrusion.

3. A draw-piece for supporting a melting in an electron beam melting apparatus and vacuum melting apparatus, or the like, comprising;
    a block member having a forming surface at one end including a recess within that surface and including a shaftway extending parallel to and beneath said surface and opening on to two sides adjacent to said surface and transversely intersecting said recess slightly above its bottom,
    a bolt slidably mounted within said shaftway end of sufficient length to extend across said recess,
    a hollow sleeve slidably mounted on and completely surrounding the exposed portion of said bolt extending across said recess, and
    means for removing said bolt from one opening of the shaftway after the formation of the melting on said block surface and around said sleeve so as to release the melting from said draw-piece following withdrawal from the melting apparatus.

4. A draw-piece for supporting a melting in an electron beam melting apparatus and vacuum melting apparatus, or the like, comprising;
    a block member having a forming surface at one end including a plurality of parallel grooves defined within said surface and including at least one shaftway extending parallel to and beneath said surface and opening on to at least two sides adjacent to said surface and transversely intersecting said grooves slightly above their base;
    at least one bolt slidably mounted within said above-named shaftway and of sufficient length to extend across said grooves, a plurality of hollow sleeves slidably mounted on and completely surrounding the exposed portion of the bolts extending across each of said grooves, and means for removing said bolts from the openings of the shaftways after the formation of the melting on said block surface and around that sleeve so as to provide for the release of the melting from said draw-piece upon withdrawal from the melting apparatus.

5. A draw-piece for supporting a melting in a melting apparatus according to claim 4, wherein said block member comprises a rectangular cast forming surface at one end, including a pair of slots arranged within said forming surface and situated within opposite side walls of said block member.

6. A draw-piece for supporting a melting in an electron beam melting apparatus and a vacuum melting apparatus, or the like, comprising a block member comprising a forming surface at one end including a slot having a longitudinal axis defined within said forming surface and extending partially thereacross terminating at each end within said surface, a shaft way extending below said surface and along said longitudinal axis for providing openings on two sides adjacent to said forming surface, a bolt slidably disposed within said slot and extending through each of said shaftways at its end, a hollow sleeve slidably mounted and completely surrounding the exposed portion of said bolt extending longitudinally across said slot, and means for removing said bolt from one of the side openings of the shaftway after the formation of the melting on said block surface and around said sleeve thereby arranging the release of the melting from the draw-piece when the same is withdrawn from the melting apparatus.

7. A draw-piece for supporting a melting in an electron beam melting apparatus and a vacuum melting apparatus, or the like, comprising a block having formed therein at least one recess demountable hollow sleeve means releasably disposed within said recess for engaging a portion of and forming a part of said melting when in a fused condition, means slidably extending through said sleeve means and a portion of said block for releasably coupling said sleeve means to said block, said melting being releasably coupled to said draw-piece upon its withdrawal from the melting apparatus.

8. A draw-piece formed in a releasably coupled melting apparatus according to claim 7, wherein said slidable means comprises a bolt inserted through the hollow within said sleeve, such that said bolt is in slidable contact with said draw-piece, said slidable bolt being disengageable from said draw-piece and said hollow sleeve upon withdrawal of the melting from the melting apparatus.

References Cited
UNITED STATES PATENTS

| | | | |
|---|---|---|---|
| 2,176,990 | 10/1939 | Crampton | 22—200.1 X |
| 3,080,625 | 3/1963 | Pearson et al. | 22—200.1 X |

J. SPENCER OVERHOLSER, *Primary Examiner.*

R. S. ANNEAR, *Assistant Examiner.*